United States Patent [19]

Field et al.

[11] 3,897,333
[45] July 29, 1975

[54] FLOCCULATING AGENTS

[75] Inventors: John R. Field, Halifax; Graham Smalley, Huddersfield, both of England

[73] Assignee: Allied Colloids Manufacturing Co., Ltd., Yorkshire, England

[22] Filed: Mar. 28, 1974

[21] Appl. No.: 455,700

Related U.S. Application Data

[63] Continuation of Ser. No. 224,282, Feb. 7, 1972, abandoned.

[30] Foreign Application Priority Data

Feb. 24, 1971  United Kingdom.............. 5347/71

[52] U.S. Cl. ................ 210/10; 210/54; 260/89.7 N
[51] Int. Cl. ........................... C02c 3/00; C02b 1/20
[58] Field of Search ................... 210/10, 52–54; 260/89.7 N

[56] References Cited
UNITED STATES PATENTS

| | | | |
|---|---|---|---|
| 2,980,657 | 4/1961 | Melamed | 260/89.7 N |
| 3,171,805 | 3/1965 | Suen et al. | 210/54 |
| 3,472,767 | 10/1969 | Lees | 210/10 X |
| 3,503,946 | 3/1970 | Scanley et al. | 260/89.7 N |
| 3,661,880 | 5/1972 | Markert et al. | 260/89.7 N |

FOREIGN PATENTS OR APPLICATIONS 887,900   1/1962   United Kingdom............ 260/89.7 N

*Primary Examiner*—Thomas G. Wyse
*Attorney, Agent, or Firm*—Lawrence Rosen; E. Janet Berry

[57] ABSTRACT

New high molecular weight, water soluble polymers containing a substantial proportion of recurring quaternised aminomethyl acrylamide or methacrylamide groups are of value as flocculants, especially for suspensions of organic matter of a proteinaceous or cellulosic nature.

4 Claims, No Drawings

FLOCCULATING AGENTS

The present application is a continuation of application Serial No. 224,282, filed Feb. 7, 1972 now abandoned.

This invention relates to new polymers that are of particular value as flocculants and to compositions for and methods of flocculating suspensions, especially suspensions of organic matter of a proteinaceous or cellulosic nature such as are to be found in sewage treatment effluents.

It is commonly accepted that such suspended materials which are hydrophilic in nature and which often have specific gravities quite close to that of the aqueous liquors in which they are suspended, contrast in a marked way with the more hydrophobic mineral suspensions, in that they are frequently found to be much more difficult to flocculate economically with chemical reagents prior to a physical dewatering step such as filtration, flotation or sedimentation. These difficulties are particularly noticeable when higher proportions of suspended matter are present, commonly involving concentrations of 0.5 percent by weight upwards wherein the suspensions take on a paste-like consistency and are commonly described as sludges.

It is well known to assist the dewatering of sewage sludges and similar organic suspensions by mixing into them chemical reagents in order to induce a state of coagulation or flocculation which thereby facilitates the process of separation of water. For this purpose lime or salts of iron or aluminium are in use and more recently synthetic polyelectrolytes, particularly certain cationic copolymers of acrylamide, have been found of interest.

Thus U.S. Pat. No. 3,409,546 describes the use of N(amino methyl) polyacrylamides in conjunction with other cationic polymers for the treatment of sewage sludges. U.S. Pat. No. 3,414,514 describes the use of a copolymer of acrylamide and a quaternised cationic methacrylate ester. It is also well known to use polyethyleneimines and homopolymers of cationic acrylates and methacrylates and other cationic polymers such as polyvinyl pyridines.

Notwithstanding the variety of commercially available polymers which have been found to be capable of flocculating or coagulating organic sludges there are various circumstances which tend to limit the usefulness of these reagents. Thus whilst on certain sludges economical treatments with these reagents have been found possible, it is quite common to encounter sludges which require very high dosages of reagents in order to treat them successfully. Also variations often occur in sludge from any one source, for example because of variations in the supply of material to the sludge making process and/or variations in the oxidising conditions that may be involved in the production of the sludge. Furthermore it is not uncommon to encounter sludges which are, for some reason, not amenable to flocculation by any of the known polymeric flocculating agents.

It has been our object to provide polymeric materials that are improved flocculating agents for organic sludges.

The new polymers of the invention are water soluble polymers having an intrinsic viscosity of at least 0.5, as determined by measurements of the viscosity of the polymers in 3 molar sodium chloride solution, and which are composed of recurring units of which substantially 40 percent or more have the formula:

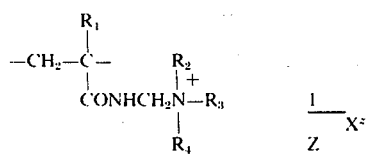

where z is an integer, usually 1, 2 or 3, X is an anion, $R_1$ is hydrogen or methyl, $R_2$ is lower alkyl, and $R_3$ and $R_4$, which may be the same or different, are lower alkyl or hydroxy lower alkyl, or $R_3$ and $R_4$ together with the nitrogen atom to which they are attached may form a cyclic ring system preferably containing 5 to 8 carbon atoms. A suitable ring system has the formula:

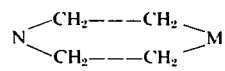

where N is the quaternary nitrogen atom of the cationic group and M is oxygen, NH or alkylene, for example $CH_2$. In this specification the term "lower alkyl" is used to denote an alkyl group containing from 1 to 8 carbon atoms, preferably 1 to 4 carbon atoms. Suitable examples of $R_2$ are methyl, ethyl, propyl and n- or iso-butyl. Such radicals may also serve as $R_3$ or $R_4$, as also may the corresponding hydroxy substituted radicals. Suitable hydroxy lower alkyl radicals have the formula $C_nH_{2n}OH$ where n is 2, 3 or 4. The preferred polymers are those in which $R_2$, $R_3$ and $R_4$ all represent methyl or ethyl.

The positive ionic charges resident on the polymer chain by virtue of the recurring cationic units depicted above will be electrically balanced by an equivalent number of counter-anions $X^-$ which may be organic or inorganic in character. X is most preferably a monovalent anion, but it could be a di or poly valent anion provided that the presence of such an anion did not give rise to products which are insoluble in water. Typical anions that may be used are the sulphate, chloride, iodide and bromide. Suitable organic anions include acetate, methyl sulphate or ethyl sulphate.

At least substantially 40 percent of the recurring units of the polymer must be of the formula specified. Preferably at least 60% of the recurring units should be of the formula specified, and most preferably at least 80%. Some or all of any other recurring units in the polymer may be acrylamide or methacrylamide units. The polymer may contain also other units derived from other vinyl monomers. These may be introduced primarily for the purpose of reducing the cost of the product. Such units may be derived from various water soluble monomers, such as acrylic acid or methacrylic acid or from water insoluble monomers such as vinyl acetate, methyl acrylate, acrylonitrile or styrene. The inclusion of some of these other units may result in a reduction in the water solubility of the polymer and naturally care must be taken to ensure that the nature and amount of such comonomers is such that the polymer remains sufficiently water soluble for the intended purpose.

The polymer is preferably prepared by forming a polymer containing acrylamide or methacrylamide units and then aminomethylating and quaternising some at least of these. If the starting polymer is a copolymer with, for example, only 40 percent of the recurring units being acrylamide or methacrylamide units then substantially all of these must be aminomethylated and quaternised.

The starting polymer containing acrylamide or methacrylamide units is preferably obtained by polymerising acrylamide or methacrylamide, or mixtures thereof, optionally with other suitable comonomers such as those indicated above. However it may also be made by, for example, hydrolysing a suitable acrylonitrile polymer.

By saying that the polymers of the invention are water soluble we mean that they completely dissolve in water at the concentration and under the conditions in which they are used for flocculating suspensions. For convenience it can be stated that the polymers are soluble at ambient temperatures in waters having a pH of between 1 and 14 and at a concentration of at least 5 percent.

The polymers of the invention must be of high molecular weight, and this is indicated by their intrinsic viscosity which must be at least 0.5, when determined on a solution of the polymer in 3 Molar sodium chloride solution. Preferably it is 1 or greater.

The polymers of the invention are preferably substantially linear polymers.

The polymers of the invention are best made by first forming a homopolymer of copolymer of acrylamide and/or methacrylamide and optionally other comonomers, of the desired molecular weight, for example by conventional polymerisation of the monomers in the presence of a free radical catalyst. The amide groups are then aminomethylated, preferably by subjecting the polymer to aminomethylation, i.e. by reacting it with formaldehyde and a suitable secondary amine. The preferred secondary amine is dimethylamine or diethylamine but others that may be used include, for example, piperidine and di-($\beta$-hydroxy ethyl)amine.

Thereafter the tertiary aminomethyl groups introduced into the polymer are quaternised, for example by causing the polymer to react with a suitable alkylation agent, for example dimethyl sulphate, methyl chloride, methyl iodide or methyl bromide or corresponding compounds in which the methyl radical is replaced by another alkyl radical.

The amounts of formaldehyde and amine used for the aminomethylation are selected to give the desired degree of aminomethylation and usually are substantially 100% of the theoretical amount required to react all amide groups in the polymer. Preferably substantially all the amide groups are aminomethylated but in practice this generally means that the amount that are aminomethylated is between 80 and 90% of the total.

The amount of alkylation agent used is preferably such as to permit complete quaternisation of the aminomethyl groups.

Whilst the new polymers can be used to assist in the dewatering of a wide variety of suspensions they show the greatest advantage over prior art materials on sludges of organic matter which are proteinaceous or cellulosic in origin or which have been obtained by biological degradation of such matter.

The organic suspension may be derived from raw and/or processed sewage, food waste, fermentation waste or other dilute organic suspension. This organic suspension may be subjected to one or more sedimentation stages to remove some at least of the liquid and then the solids may be subjected to a biological anaerobic digestion stage to produce digested sludge. The sludge usually has a solids content of from about 1 percent to about 8 percent by weight although under certain circumstances it can have higher or lower contents.

It is desirable to dewater the sludges or suspensions in order to facilitate their disposal. Dewatering can be effected in accordance with the invention by adding an appropriate amount of one of the polymers of the invention prior to physical removal of water. The addition is usually effected by adding an aqueous solution of the polymer, for example having a concentration of from 0.01 to 1 percent by weight and most preferably from 0.05 to 0.2 percent. The total amount of polymer added may vary considerably according to the suspension being treated and according to the degree of dewatering required. Typical addition rates for a sewage sludge would be in the range 0.1 to 0.5 percent of polymer on total weight of sludge solids. Addition may be by conventional methods and naturally some agitation of the mixture of sludge and flocculant is necessary to bring about flocculation. Thereafter separation of the separated solids from liquid may be effected by conventional methods, for example by filtration and/or sedimentation.

The invention is also of value in the paper industry particularly for effluent treatment processes where frequently difficulties are experienced in the dewatering of aqueous wastes containing cellulosic fibres, for example a paper mill aqueous waste prior to discharge of the effluent or return of purified water to a papermaking process. The invention is of particular value in treating cellulosic waste waters or sludges having a pH of greater than 8 by virtue of alkaline materials having been introduced into the process as constituents of the paper or as auxiliary processing reagents. Such cellulosic suspensions may have concentrations of suspended matter varying from 50 p.p.m. to 1 or 2 percent or even higher.

The new flocculants are more efficient than most known flocculants for sewage and other organic sludges with the result that the cost of treatment is less than with known flocculants. They also have the significant advantage in that they are effective over a wider range of sludge conditions. In particular sludge conditions, including strongly alkaline conditions, that rendered the previously known flocculants ineffective may have substantially no deleterious effect on the flocculating ability of the new flocculants.

Although the polymers are usually used as 0.01 to 1% solutions it is often convenient to formulate them as more concentrated solutions (e.g. 5 to 50% and preferably 10 to 30%) in water and to dilute them prior to use.

The invention is illustrated by the following examples.

EXAMPLE 1

A polyacrylamide resin having an intrinsic viscosity of 2.3 was prepared by homopolymerisation of acrylamide by conventional manner in the presence of a free radical catalyst.

71 grams of a 10 percent solution of this resin in water was heated for 4 hours at 70°C with 9 grams of a 36 percent solution of formaldehyde and 8 grams of diethylamine at 70°C in a flask equipped with stirrer and reflux condenser. The resultant aqueous solution was designated Product A. It was unnecessary to subject it to any purification procedures. Analysis shows that the intrinsic viscosity is substantially unchanged and that about 15 mole percent of the amide groups are unreacted while about 80 mole percent have been converted to aminomethyl amide groups while about 5 mole percent have been converted to hydroxymethylamide groups. Product A is typical of the N-(aminomethyl) acrylamides of the prior art.

EXAMPLE 2

A process of Example 1 was repeated but the resulting solution of Product A was subsequently heated for 4 hours at 30°C. with 14 grams of dimethyl sulphate, and was then allowed to cool. Again no purification of the resultant aqueous solution was necessary when the polymer was to be used as a flocculating agent but if desired the polymer can be obtained from the solution by conventional methods. For example this solution may be dried in vacuum at 50°C. or below to form a solid. Analysis shows that the intrinsic viscosity of the product, labelled Product B, is 2.3 and that the product contains about 15 mole percent amide groups, 5 mole percent hydroxymethyl amide groups and 80 mole percent quaternised aminomethyl groups, the groups being of the formula shown above in which $R_2$, $R_3$ and $R_4$ are all methyl and X is methyl sulphate.

EXAMPLE 3

Products A and B were tested as flocculants on the sewage sludge resulting from an anaerobic digestion process. In practice this digestion process results in the production of carbon dioxide, some of which remains dissolved in the sludge liquor. According to the manner in which the sludge is handled more or less of this carbon dioxide may remain in the sludge and this can affect the flocculation ability of flocculants used for dewatering the sludge. In practice the carbon dioxide is generally removed and in this experiment, which is conducted on a digested sludge obtained from local authority domestic sewage, the sewage was air blown to remove carbon dioxide. Samples of the sewage were removed periodically and were subjected to dewatering using, as flocculant, Product A or Product B. In each test the amount of Product A or B was 0.2 percent calculated as solid polymer on sludge solids and was added as a 0.5 percent solution in water. The addition was effected under conditions of moderate agitation. Afer addition the sewage-flocculant mixture was stirred and the dewatering characteristics of the sludge measured by the Capillary Suction Time (CST) as defined in the Ministry of Technology Techlink No. 632, August 1970. In this test the time is measured for the withdrawal of liquid from the sludge mass by the capillary action of an absorbent filter paper. Very good correlations are usually obtained between this laboratory test and plant results. With this sludge a capillary suction time of 100 secs. or less is indicative of excellent sludge conditioning. The results are given in Table I.

TABLE I

| Air Blowing Time (mins) | C.S.T. (sec) After Decarbonation | | | |
|---|---|---|---|---|
| | 5 minutes | 10 minutes | 20 minutes | 30 minutes |
| Product A | 70 | 150 | 830 | 860 |
| Product B | 40 | 55 | 53 | 55 |

It can be seen from this that Product B, a product of the invention, gave fast dewatering at all stages of decarbonation, whereas Product A is less efficient initially and its effectiveness rapidly decreases as decarbonation proceeds.

EXAMPLE 4

The process of Example 1 was repeated except that the intrinsic viscosity of the polyacrylamide resin, and of the aminomethylated acrylamide, was 1.0 instead of 2.3. Apart from this the analysis of the product was substantially the same as in Example 1. The product was labelled C.

EXAMPLE 5

The product of Example 4, as a 10 percent solution in water was heated for 48 hours with an equimolar quantity of methyl chloride in an autoclave at 50°C. The analysis of the product was similar to the analysis of the product in Example 2 except that the intrinsic viscosity was 1.0 and X was chloride. If desired the product can be isolated by a method such as is described in Example 2. The product was labelled D.

EXAMPLE 6

A digested sludge of solids content 2.1 percent and pH 7.3 was sparged with air on a sewage plant to provide stability by removal of carbon dioxide. The pH thereby rose to 7.8. A number of cationic sewage conditioning reagents were compared in the laboratory by the C.S.T. test indicated in Example 3, using the original sludge and the air sparged sludge. The reagents used were Product C, of Example 4,
Product D of Example 5,
A commercially available polyethylene imine of m.w. 100,000 labelled Product E, and
A commercially available copolymer derived from acrylamide and dimethylamino ethyl methacrylate in the proportions 50/50 quaternised with methyl chloride, labelled Product F.

The results are given in Table II below. The products were applied at the rate of 0.25 percent of polymer on the sludge solids. At this rate of application a satisfactory result would be considered to be a C.S.T. of 50 seconds or less.

TABLE II

| Product | C.S.T. (seconds) | |
|---|---|---|
| | Original Sludge | Air Sparged Sludge |
| C | 20 | 122 |
| D | 14 | 30 |
| E | 120 | 179 |
| F | 24 | 86 |

It is apparent that the product of the invention, Product D, gave the best results. Surprisingly Product F, which also contains quaternary groups, did not perform well on this sludge.

EXAMPLE 7

A sludge sample was taken from a sewage works where mixed primary and activated sludge is subjected to mesophilic digestion to reduce the organic content prior to dewatering. A second sample was taken from the same digester 2 weeks later. Several cationic sewage treatment chemicals were examined as to their effectiveness in conditioning this sludge by the laboratory C.S.T. test. The first sludge sample had a solids content of 2.8 percent and the organic content of the solids was 49 percent. The second sludge sample had a solids content of 4.0 percent and the organic content of the solids was 60%. The following reagents were examined:

Product B of Example 2;
Products E and F as defined in Example 6;

product on the dry matter of the sludge, by pipeline mixing of the reagent. One bed was treated with Product B and the other with Product G. C.S.T. Tests were carried out on the treated sludge and measurements were taken to determine the sludge solids content at weekly intervals to check the extend of dewatering. The length of drying time which elapsed before the bed was sufficiently dry to lift was also noted. The results are given in Table IV.

TABLE IV

| Product | Day | CST(secs) of treated sludge | % Sludge Solids versus Time (wks) | | | | | Bed lifted |
|---|---|---|---|---|---|---|---|---|
| | | | 0 | 1 | 2 | 3 | 4 | 5 | |
| G | 1 | 87 | 3.1 | 9.0 | 10.9 | 12.1 | 16.2 | 17.6 | 12 weeks |
| B | 1 | 42 | 3.1 | 10.2 | 12.7 | 26.2 | 35.8 | 40.6 | 5 weeks |
| G | 2 | 62 | 2.9 | 9.2 | 10.0 | 15.4 | 23.7 | 30.2 | 8 weeks |
| B | 2 | 36 | 2.9 | 10.4 | 12.5 | 25.6 | 36.3 | 42.6 | 5 weeks |

Product G - a commercially available copolymer from acrylamide and a quaternary alkyl amino ethyl acrylate in the proportions 30/70 by weight and having an intrinsic viscosity of 6.5;

Product H - a commercially available cationic sewage conditioning reagent of the polyamide/epichlorhydrin resin type;

Product I - a commercially available amino methyl polyacrylamide

The reagents were applied at dosage levels corresponding to 0.3, 0.4 and 0.5 percent on the dry matter of the sludge.

With this sludge a C.S.T. of 100 seconds or less would correspond to satisfactory sludge conditioning. The CST values obtained are given in Table III.

TABLE III

| Product | First Sludge Sample | | | Second Sludge Sample | | |
|---|---|---|---|---|---|---|
| | 0.3% | 0.4% | 0.5% | 0.3% | 0.4% | 0.5% |
| B | 55 | 22 | 11 | 53 | 23 | 11 |
| E | 1,392 | 976 | 843 | 1,397 | 1,045 | 961 |
| F | 297 | 80 | 36 | 966 | 663 | 224 |
| G | 372 | 56 | 56 | 401 | 64 | 50 |
| H | 1,164 | 723 | 623 | 1,066 | 841 | 547 |
| I | 217 | 55 | 26 | 961 | 843 | 800 |

The marked superiority of B over the known flocculants is apparent.

EXAMPLE 8

Drying Bed Trials

Products B and G were subjected to large scale testing on underdrained drying beds at a municipal sewage works on two separate occasions.

On each occasion two adjacent beds were filled with sewage sludge treated at a dose rate of 0.3 percent of The great benefit derived from the use of B is apparent.

EXAMPLE 9

Vacuum Filter Trials

A mixed primary and humus sludge, solids content 4-8%, was dewatered at a municipal sewage works on Komline-Sanderson Coil Filters by use of lime plus another material as conditioning agent. The results obtained using three such combinations are given in Table V.

TABLE V

| Conditioning Agent | Dosage % on dry solids of sludge | Filter Cake % moisture content | Filter Output lbs. dry solids ft²/hour |
|---|---|---|---|
| Lime | 15% | | |
| Copperas (ferrous sulphate) | 7 ½% | 20 | 2.3 – 2.5 |
| Lime | 10% | | |
| Hydrolysed polyacrylamide | 0.15% | 19 – 20 | 4.0 – 6.0 |
| Lime | 3% | | |
| Product B | 0.15% | 20 | 7.0 – 9.5 |

Coperas and hydrolysed polyacrylamide are conventional agents in this process. From these tests it was apparent that it was possible as a result of the invention to reduce the number of filter units required to deal with the sludge and thereby, in addition to reducing total reagent costs, a significant reduction in running costs could be achieved.

The processes of Examples 1 and 2, and 4 and 5 may be repeated using, instead of acrylamide as the sole monomer, methacrylamide. They also may be repeated using, instead of acrylamide as the sole monomer, a mixture of acrylamide and methacrylamide, for example a 50:50 mixture as the starting monomer. They may also be repeated using a mixture of acrylamide with vinyl acetate, for example 90 parts acrylamide to 10 parts vinyl acetate. Various other suitable combinations of acrylamide, methacrylamide and other copolymerisable monomers may also be used. The results obtained when using any of the resultant polymers in place of Products B and D are similar to the results quoted in the Examples above and below.

EXAMPLE 10

The water born wasted from a food factory dealing with vegetable processing were subjected to surface aeration and settlement before being discharged. The settled solids appeared as a sludge having approximately 2% solids concentration and this was treated with lime to give a pH of 11.0 prior to dewatering on a centrifuge.

Comparison was made in the laboratory using the C.S.T. test, between product A of Example 1 and product B of Example 2. Also included in the test were product F of Example 6 and product G of Example 7.

The dosage of all products tested was equivalent to 100 grams of solid reagent per cubic metre of sludge. The products were added as 0.1% solutions in water and the sludge was stirred at 250 revolutions per minute during the addition of the reagent solution.

The product B of the invention gave the very low capillary suction time (C.S.T.) of 11 seconds, indicating a very satisfactory degree of dewatering. All other products tested gave C.S.T. value of greater than 830. Hence only the product B was active on this sludge at the stated dose rate.

EXAMPLE 11

A paper mill effluent contained about 0.15% filterable suspended solids consisting principally of cellulosic fibres and a much smaller proportion of colloidally suspended impurity. The pH was approximately 10. The effluent was treated primarily in an air flo action device whereby solid material is caused to rise to the surface where it concentrates and is then removed by a mechanical scoop. In carrying out flotation tests it is found that good correlation between laboratory and full scale plant results can be obtained by using the following procedure.

First the flocculating reagent is added to a small sample of the effluent under conditions of mild agitation. Then sample is transferred to a pressure bottle, into which air is introduced up to a pressure of 35 pounds per square inch. The bottle is gently shaken for one minute and the pressure slowly released. The bottle contents are then poured into a measuring cylinder and the rising time of the solids/liquid interface is measured. Five minutes later a sample of the subnatant liquid is withdrawn by pipette and the suspended solids remaining therein are assessed by weighing after filtration and retention in a sintered glass funnel.

In this test the various flocculants utilised in the previous examples were examined at an addition rate of 4 grams of active reagent per cubic meter of sludge. The results obtained are given in Table VI.

TABLE VI

| Product | Rising Time (Seconds) | Subnatant Suspended Solids p.p.m. | Visual Clarity |
|---------|----------------------|-----------------------------------|----------------|
| A       | > 500                | 850                               | very poor      |
| B       | 90                   | 50                                | Good           |
| E       | 250                  | 160                               | Poor           |
| F       | 160                  | 80                                | Very good      |
| G       | 130                  | 80                                | Fair           |

It can be seen that the product of the invention, B, gave markedly superior results in terms of rising time and residual suspended solids.

When the effluent sample was treated with aluminium sulphate prior to addition of the product B even better results were obtained, as is shown in Table VII.

Table VII

| Product | Rising Time (seconds) | Subnatant Suspended Solids (p.p.m.) | Visual Clarity |
|---------|----------------------|--------------------------------------|----------------|
| B       | 110                  | 40                                   | Good           |
| Aluminium sulphate (100 p.p.m. dosage) | 300 | 190 | Good |
| Aluminium sulphate at 100 p.p.m. +B at 4.0 p.p.m. | 90 | 30 | Excellent |

We claim:

1. A method in which an organic suspension selected from raw sewage sludges and sludges obtained by biological degradation is flocculated by adding to the suspension an aqueous solution of a polymer having an intrinsic viscosity of at least 0.5 when measured in 3 Molar sodium chloride and composed of recurring units of which substantially 60% or more have the formula:

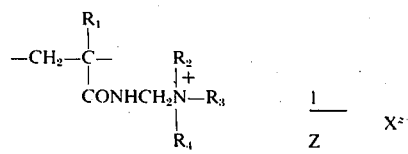

where $R_1$ is hydrogen, $R_2$, $R_3$ and $R_4$ are methyl, X is an anion selected from the group consisting of methyl sulfate and chloride and z is an integer, and wherein the remainder of the polymer is a nonquaternized acrylamide.

2. A method according to claim 1 in which the suspension is a sludge obtained by biological degradation.

3. A method according to claim 1 in which the suspension is a sludge obtained by biological degradation and is a digested sewage sludge.

4. A method according to claim 1 wherein the polymer is composed of substantially 80 percent or more of the recurring units.

* * * * *